(12) United States Patent
Lu et al.

(10) Patent No.: US 8,117,410 B2
(45) Date of Patent: Feb. 14, 2012

(54) TRACKING BLOCK-LEVEL CHANGES USING SNAPSHOTS

(75) Inventors: Ping Lu, Mountain View, CA (US); Ilia Langouev, Santa Cruz, CA (US); Aleksey V. Pershin, Fremont, CA (US); Sudarsan R. Piduri, Santa Clara, CA (US); Erik Weathers, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 278 days.

(21) Appl. No.: 12/618,280

(22) Filed: Nov. 13, 2009

(65) Prior Publication Data

US 2010/0077165 A1 Mar. 25, 2010

Related U.S. Application Data

(63) Continuation-in-part of application No. 12/197,768, filed on Aug. 25, 2008, now Pat. No. 8,037,032.

(51) Int. Cl.
*G06F 12/00* (2006.01)

(52) U.S. Cl. ........ 711/162; 711/112; 711/114; 711/156; 707/625; 707/646; 707/649; 707/672; 707/673; 707/695

(58) Field of Classification Search .................. 711/162, 711/112, 114, 156; 707/625, 646, 649, 672, 707/673, 695
See application file for complete search history.

(56) References Cited

U.S. PATENT DOCUMENTS

| | | | | |
|---|---|---|---|---|
| 7,100,089 | B1 * | 8/2006 | Phelps | 714/42 |
| 7,743,031 | B1 * | 6/2010 | Cameron et al. | 707/649 |
| 7,886,119 | B1 * | 2/2011 | Cameron et al. | 711/162 |
| 2008/0162590 | A1 * | 7/2008 | Kundu et al. | 707/202 |
| 2009/0222496 | A1 * | 9/2009 | Liu et al. | 707/204 |
| 2010/0077165 | A1 * | 3/2010 | Lu et al. | 711/162 |

OTHER PUBLICATIONS

PHD Consulting LLC. "EsXpress v3 Installation Guide", published Nov. 13, 2006.
PHD Technologies, Inc. "Introducing EsXpress v3", published Nov. 27, 2006.
PHD Technologies, Inc. "EsXpress v3.1 Users Manual", published Mar. 27, 2008.

* cited by examiner

*Primary Examiner* — Stephen Elmore

(57) ABSTRACT

Writes to blocks of a protected storage volume that occur between the beginning of a prior backup interval and the beginning of a current backup interval are tracked using a first snapshot that is maintained through the current backup interval. At the beginning of the current backup interval, a second snapshot is generated. Blocks that are indicated by a dirty block list of the first snapshot as having been changed are read from the snapshot volume for the second snapshot and copied to a backup storage volume. For the next backup interval, the second snapshot or alternatively, a newly generated third snapshot, is used to track writes to blocks of a protected storage volume that occur between the beginning of the current backup interval and the beginning of a next backup interval.

24 Claims, 9 Drawing Sheets

TRACKING BLOCK-LEVEL CHANGES USING SNAPSHOTS

CROSS-REFERENCE TO RELATED APPLICATION(S)

This application is a continuation-in-part of U.S. patent application Ser. No. 12/197,768, filed on Aug. 25, 2008, now U.S. Pat. No. 8,037,032, which is hereby incorporated by reference in its entirety.

BACKGROUND OF THE INVENTION

As data storage systems become ever bigger, providing efficient backup storage becomes increasingly important. Even if one is not concerned with the cost of the needed storage space, the time required to perform all the necessary copy operations becomes increasingly burdensome. For a large system, a full backup procedure can be time-consuming, requiring several hours or even days to complete. For this reason, backup procedures often provide "incremental" backups where only blocks or files which have changed since the last backup are copied. Typically, a full backup procedure is performed at infrequent intervals (for example, at an initial time followed by long intervals such as once per month). Thereafter, incremental backups are created more frequently, for example, once per day. Examples of commercial incremental backup products include TRUE IMAGE™ from ACRONIS®, Inc. and NORTON GHOST™ from Symantec Corporation.

Backups can be used for a variety of purposes. They can be used to recover from user error when, for example, the user inadvertently deletes or overwrites a file. They can be used to recover from data loss due to hardware failure such as a hard disk failure. They can also be used to recover from software failures such as application or operating system crashes. The goal of recovery after a crash is to restore the last available known good operating state for the complete system. This can be done by rebooting the same hardware after restoring the file system from a suitable backup, but the recovery procedure can be very time-consuming if the entire file system must be restored. For this reason, virtual machines (VMs) are sometimes used for backup purposes. When a VM is used for backup purposes, it is typically not used as a running machine unless and until it is needed for restoring a failed machine. Typically, the VM is launched, booted, and tested only to verify functionality and then it is shut down; however, it can be brought back on-line quickly if and when needed to replace the failed source machine for which it is functioning as a backup.

Using a VM as a backup is useful in that, if the source machine goes down, the VM can be quickly powered on in its place. With traditional backup methods, a full system restore can take hours, while the VM can be up and running in a few minutes. But whether using traditional file system backups or VMs as backups, changes made since the last backup procedure are lost. Examples of commercial products that enable VMs to be used for backup include POWERCONVERT™ from PLATESPIN®, Ltd. and VEEAM BACKUP™ from Veeam Software.

To perform an incremental backup on a protected system, a backup application needs to track which blocks of a storage device of the protected system are changed between backup cycles and transmit the changed blocks to the virtual machine serving as the backup at the start of the next backup cycle. In most cases, a filter driver can be installed on the protected system, which will keep track of modified blocks. However, in some cases, it may not be possible to use such a driver. In such cases, the backup application can perform a hash-based replication cycle, which involves reading all used blocks in the system, calculating their hashes, comparing them to the hashes of the blocks already stored in the backup and then backing up the changed blocks. Reading all used blocks is an expensive operation in terms of CPU and I/O resources involved. Moreover, due to the length of the operation, very short backup cycles cannot be achieved with such an approach.

SUMMARY

One or more embodiments of the present invention provide an alternative method for tracking which blocks of a storage device of a protected system have been changed. In this alternative method, a snapshot (in particular, a dirty block list of the snapshot) is used to track changed blocks directly.

A method of performing an incremental backup according to an embodiment of the invention includes the steps of generating a first snapshot of a source storage volume before the beginning of a prior backup cycle and maintaining the first snapshot through a current backup cycle, generating a second snapshot of the source storage volume at the beginning of the current backup cycle, examining a dirty block list of the first snapshot to identify a set of blocks of the source storage volume that have changed since the last backup, and copying the changed blocks to the backup storage volume using the second snapshot. After completion of the current backup cycle, the first and second snapshots are discarded. For the next backup cycle, third and fourth snapshots are used. The third snapshot is generated before the beginning of the current backup cycle and the fourth snapshot is generated at the beginning of the next backup cycle.

A method of performing an incremental backup according to another embodiment of the invention includes the steps of generating a first snapshot of a source storage volume at the beginning of a prior backup cycle and maintaining the first snapshot through a current backup cycle, generating a second snapshot of the source storage volume at the beginning of the current backup cycle, examining a dirty block list of the first snapshot to identify a set of blocks of the source storage volume that have changed since the last backup, and copying the changed blocks to the backup storage volume using the second snapshot. After completion of the current backup cycle, the first snapshot is discarded but the second snapshot is maintained. For the next backup cycle, the second snapshot is used in conjunction with a third snapshot that is generated at the beginning of the next backup cycle.

Additional embodiments of the present invention provide a computer-readable storage medium containing instructions for causing a computer system to carry out the above method and a backup computer system having a processing unit that is programmed to carry out the above method.

DETAILED DESCRIPTION

Figure 1:
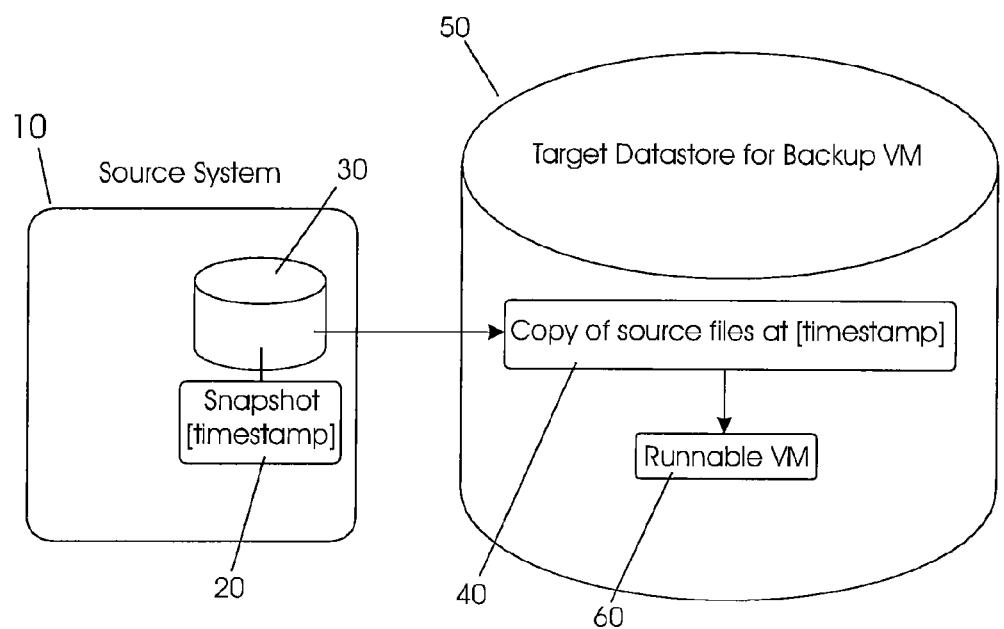
FIG. 1 helps illustrate steps involved in converting a running source machine to a virtual machine (VM).

As is well known, a virtual machine (VM) is a software abstraction, or "virtualization," of an actual physical computer system. A VM typically has a "guest" operating system (OS) of its own such as, for example, a WINDOWS® OS, a LINUX OS, or an OS-X OS.

One or more embodiments of the present invention are methods for managing backups of source computing machines (either physical machines or VMs) using VMs (note that a source computing machine is sometimes referred to herein as a source machine or as a source system). In accordance with one or more such embodiments, a backup can be for an entire source machine, including an operating system and all volumes of all disks associated with the source machine, or it can be for selected volumes of selected disks according to the needs and desires of a user. For example, a source machine with a large file system comprising multiple disks and volumes may serve both critical and non-critical roles. The user can choose to use VM backup methods to back up only those volumes necessary for critical roles, namely volumes containing the operating system and certain application-specific files. Non-critical files and volumes can be backed up separately, for example, on a less frequent schedule using a backup method that does not create VMs. Such separation into critical and non-critical backups can reduce the overhead and time required to create and maintain a backup for critical files, thereby enabling more frequent backup of the critical files.

Typically, in accordance with one or more embodiments of the present invention, a full backup procedure is carried out at infrequent intervals (an initial time followed by intervals such as, for example and without limitation, once per month). Thereafter, incremental backups can be created more frequently, for example, once per day, or even once every few minutes, provided resources and time required to carry out an incremental backup procedure is small enough.

In accordance with one or more embodiments of the present invention, the full backup procedure is carried out by converting the source computing machine to a VM, for example and without limitation, using methods that can be used to create a clone VM from a source machine. For example, one such method is performed by VMWARE CONVERTER™ with or without P2VMOTION™ from VMware, Inc. This conversion is commonly referred to as "P2V conversion" (physical-to-virtual conversion), although the source machine can also be a VM. This full backup procedure can take several hours, if not days. As such, usually, it will be scheduled to occur at regular intervals. Full backups typically require relatively large amounts of storage space, and users (for example, system administrators) may not wish to maintain copies of successive full backups indefinitely. For example, each new VM thusly created can be stored during creation as a temporary VM, and then renamed to replace a runnable backup VM once the full backup procedure is complete. Alternatively, a series of two or more timestamped VMs can be maintained to allow roll-back to a machine state at a choice of times.

Using incremental backups can reduce storage requirements and reduce, and even minimize, time between carrying out backup procedures, thereby reducing the potential amount of lost data. As with traditional incremental backup procedures, a backup procedure using a VM as an incremental backup only transfers changed blocks or files, thereby reducing overall backup time. This reduces the amount of data that must be transferred over a network to a target datastore and the load on the source computing machine to read and send the data, as well as the load on the destination machine to receive and store the data. Use of an incremental backup procedure can also enable a user to schedule more frequent running of the backup procedure: for example, once per hour or even more frequently, thereby reducing the amount of data that would be lost when it is necessary to use the backup VM due, for example, to a crash of the source computing machine. An additional benefit of using VMs for backup is that a user can test the backup VM between scheduled backup procedures, if desired, without disrupting the source computing machine.

In accordance with one or more embodiments of the present invention, a source system is a running physical machine, and a full backup procedure is carried out by converting the source system (including all or selected storage volumes thereof) to a VM (for example, without interrupting the activities of the source system). This converting step can use a converter agent (e.g., VMware Converter) which runs on the source system. FIG. 1 shows schematically the conversion of running source system 10 to a VM. As shown in FIG. 1, the conversion comprises steps of: (a) creating source snapshot 20 of source system storage volume 30 (which may be all or a subset of volumes accessed by source system 10); (b) creating a storage location 40 on target datastore 50 for a copy of source system storage volume 30 as it existed at the time defined by source snapshot 20, wherein the target datastore 50 can be accessed by a computing machine (not shown for ease of illustration) that will host the backup VM; (c) copying data specified by source snapshot 20 to source copy 40 on target datastore 50; (d) reconfiguring and customizing source copy 40 to create runnable VM 60; and (f) storing runnable VM 60 on target datastore 50.

For example and without limitation, source snapshot 20 may be created using VSS snapshot (a utility built into WINDOWS® versions since Windows XP) or third party software such as that available from ACRONIS® Inc. or STORAGECRAFT™ Technology Corporation. Source snapshot 20 captures the state of source system 10 volumes at a point in time. As is well known, a "volume" is a portion of a storage medium such as a disk (physical or virtual) that is treated as a unit by an operating system. For example, in WINDOWS operating systems, volumes are designated by "drive" letters. A volume can be all or part of a physical disk, and it can also include portions of multiple disks as, for example, when using Redundant Array of Independent Disks (RAID) storage schemes. A volume is typically "formatted" with a "file system" to enable an operating system to read and write individual files. In addition, a "snapshot" of a volume represents an image of the complete state of a volume at a point in time. A snapshot is usually not a physical copy, since it is undesirable to stop a running machine while a physical copy is made. Instead, a snapshot operation itself usually comprises recording a timestamp, and, thereafter, preserving pre-snapshot versions of all files, including subsequently deleted files. In normal operation, the operating system and application software see only the new version of the file system, including all changed and deleted files, and preserved presnapshot versions of files are made available via a special interface. When used in carrying out a backup procedure, a "source snapshot" is typically transient, and it is deleted after completion of the backup procedure. After a source snapshot is created, the source machine continues to write to volume(s) as usual, but any previously-used blocks which would be overwritten are copied into a snapshot file so that they are not lost and can be retrieved via the special interface.

In accordance with one or more further embodiments, the source machine is a VM which is running. The same snapshot methods used for a physical machine can also be used. Alternatively, the host machine for the source VM can create the snapshot file outside of the source VM using additional data storage outside that allocated for the running source VM.

In accordance with one or more embodiments of the present invention, an incremental backup procedure can be performed either at a block level or at a file level. A "block" is a portion of a volume. For backup purposes, it can be convenient to divide a volume into equal-sized blocks (sometimes with an irregular-sized block at the beginning to maintain alignment). The size of the blocks is set at the time the full backup procedure is carried out. While the block size may be arbitrary, it can be convenient to match the block size to a cluster size of the file system on the volume, where a "cluster" is a minimum-sized portion of a file system that can be read or written in a single operation. The cluster size is determined by a file system structure defined by an operating system, for example, when a disk volume is formatted. A typical cluster size is 4 kB, and is typically a multiple of a sector size, where a "sector" is a minimum-sized portion of a volume that can be read or written at a hardware level. For volumes on magnetic disks, a sector size is typically 512 bytes. For volumes on optical disks, a sector size is typically 2 kB. For unrecognized volumes, where the cluster size is not readily apparent, a default block size can be used.

When operating at the block level, the incremental backup procedure determines which blocks have changed since the last backup procedure, and it transfers only the changed blocks. When operating at the file level, the incremental backup procedure determines which files (or portions of files) have changed since the last backup procedure, and transfers only the changed files. In accordance with one or more such embodiments of the present invention, the operating mode (for example, file level or block level) for the incremental backup procedure must be chosen at the time of the first full backup procedure, and it cannot be changed until another full backup is made.

Performing incremental backups at the file level has an advantage of being independent of an underlying file system structure. As such, the source volume can be defragmented, or even restored, from another backup, without affecting the incremental backups. In particular, the incremental backup procedure sees only the contents of each file, and it disregards where the file is actually stored in a volume. However, file-level backup is generally more complex than block-level backup, because there are many file operations besides "read" and "write" (for example, "rename" and "delete") that need to be captured and properly "replayed" on the backup volume. In particular, implementing block level incremental backup is easier than file level incremental backup because, for each block in a volume, the backup procedure only needs to know whether or not the block has changed. There is no need to be aware of any high-level file operations. However, simple defragmentation will cause a large amount of data in the volume to be transferred during the next incremental backup because many blocks will have changed even if files have not. For most users, defragmentation is performed at infrequent intervals and block mode backups are preferable.

In certain embodiments, the volume is not split into equal-sized blocks starting from the very beginning of the volume. For example, when using certain file systems (such as FAT12, FAT16, and FAT32), there is an area at the beginning of the volume that is reserved for file system use, and it is possible for backup blocks to be misaligned with respect to file system clusters, thereby causing a potential doubling of the amount of data that must be transferred during incremental backup procedures. To make sure that backup blocks are aligned with file system clusters, the first backup block on the volume can be of any size (but no larger than the size of the remaining blocks).

In certain other embodiments, for example using NTFS file systems, no alignment is necessary, and the first backup block can have the same size as all other backup blocks. File systems, not requiring alignment (like NTFS) will be used as exemplary to simplify presentation of other aspects of embodiments of the present invention.

In addition to maintaining alignment with respect to any irregularly sized storage area at the beginning of the volume, it can be useful to maintain alignment of groups of clusters. For example, in accordance with one or more embodiments of the present invention, the backup procedure can use stored information about which blocks are currently in use. In accordance with one or more such embodiments, a set of bits is stored where each bit represents whether or not a particular block is in use, and the backup procedure can process only blocks whose corresponding bit indicates that it is in use. For example and without limitation, these bits can be grouped into bytes (8 bits), and it can be computationally convenient to keep backup blocks aligned on 8-cluster boundaries so that in-use indicator bytes remain aligned.

An incremental backup procedure must first determine which blocks or files have changed since the last backup (whether full or incremental). In accordance with one or more embodiments of the present invention, to determine whether a particular block needs to be copied during the next incremental backup, hashes are calculated for each block. A hash is a relatively small integer that is calculated by a pre-defined formula from a set of data, where "relatively small" is measured by comparison to the size of the dataset since the hash ought to take less storage, and preferably significantly less storage, than the dataset for it to be useful. Hashes are designed so that any change in the set of data is likely to result in a different hash. There are many specific algorithms that can be used depending on the nature of the data, possible errors or differences, and the application. Thus, any hash algorithm that gives a suitably high probability of generating a unique value for each block may be used as long as any changes made to a block are likely to cause a different number to be generated. Tradeoffs can be made between higher probability of uniqueness on the one hand and algorithm complexity and hash length on the other hand. For example, the SHA-256 algorithm produces a 256-bit (32-byte) number that provides robust detection of differences between blocks while not requiring excessive storage or calculation time. For typical file systems, the cluster size is 4 kB (4096 bytes), and the total storage space required for the hash values is 32/4096=0.8% of the file system size.

In accordance with one or more such embodiments, blocks that have the same hash values are assumed to be the same and are not transferred. If a block is changed, but has exactly the same hash value as the corresponding block on the target volume, the block will not be transferred and the data will be lost. Using a good hash algorithm makes the probability of such data loss low, and using a hash function at least as robust as the SHA-256 algorithm makes the probability of data loss acceptably low for almost all users. Less robust algorithms may also be acceptable to many users.

In accordance with one or more embodiments of the present invention, hashes are stored in a hash file (not shown) on target datastore 50 (referring to FIG. 1). Further, in accordance with one or more such embodiments of the present invention, program code for an incremental backup procedure is installed on the source system (referring to FIG. 1, source system 10) where it can have the fastest access to all volumes of the source system storage (referring to FIG. 1, source system storage volume 30). As such, and in accordance with one or more such embodiments, hash calculations and comparisons are performed on the source machine (referring to FIG. 1, source system 10). Therefore, the source machine must retrieve the hash file from the target datastore (referring to FIG. 1, target datastore 50). For simplicity, one can describe the process as if the entire hash file is read from the target datastore at the beginning of an incremental backup procedure. In accordance with one or more such embodiments, program code for the incremental backup procedure can use a fixed-size buffer for the hash file to minimize memory requirements. In addition, as a further optimization, the code does not need to calculate the hash values for all source blocks in advance. Instead, the code can read source blocks in relatively small chunks, calculate hash values for all blocks in the chunk, and then, transfer changed blocks and hashes to the target datastore. In this way, data transfer to the target datastore can proceed in parallel with subsequent source block reads and hash calculations, thereby saving time overall.

Note, however, in accordance with one or more embodiments of the present invention, that the entire source volume (referring to FIG. 1, source system storage volume 30) must be read and new hashes for every used block must be calculated, regardless of how many blocks need to be transferred. Typically, the incremental backup procedure runs on the source system with local (or fast) access to the source volumes. While source volume access may be fast, the time required for reading all used blocks and calculating new hashes can be a limiting factor in determining how frequently incremental backups can be performed. An incremental backup can still take much less time than a full backup, because the time required for copying blocks and their associated hashes to the target datastore is typically much longer than that needed to read blocks and calculate hashes on the source system. Reducing the number of blocks that must be copied is therefore an important factor in minimizing the time required for a new backup.

In accordance with one or more embodiments of the present invention, the block hash file can be stored on the target datastore in a separate virtual disk called a hash disk. The hash disk can have a real master boot record (MBR) with exactly one partition covering the entire disk. Although, the hash disk need not be made visible to the guest operating system of any bootable VM, maintaining a valid MBR structure is useful to protect the hash data from accidental access.

Figure 2:
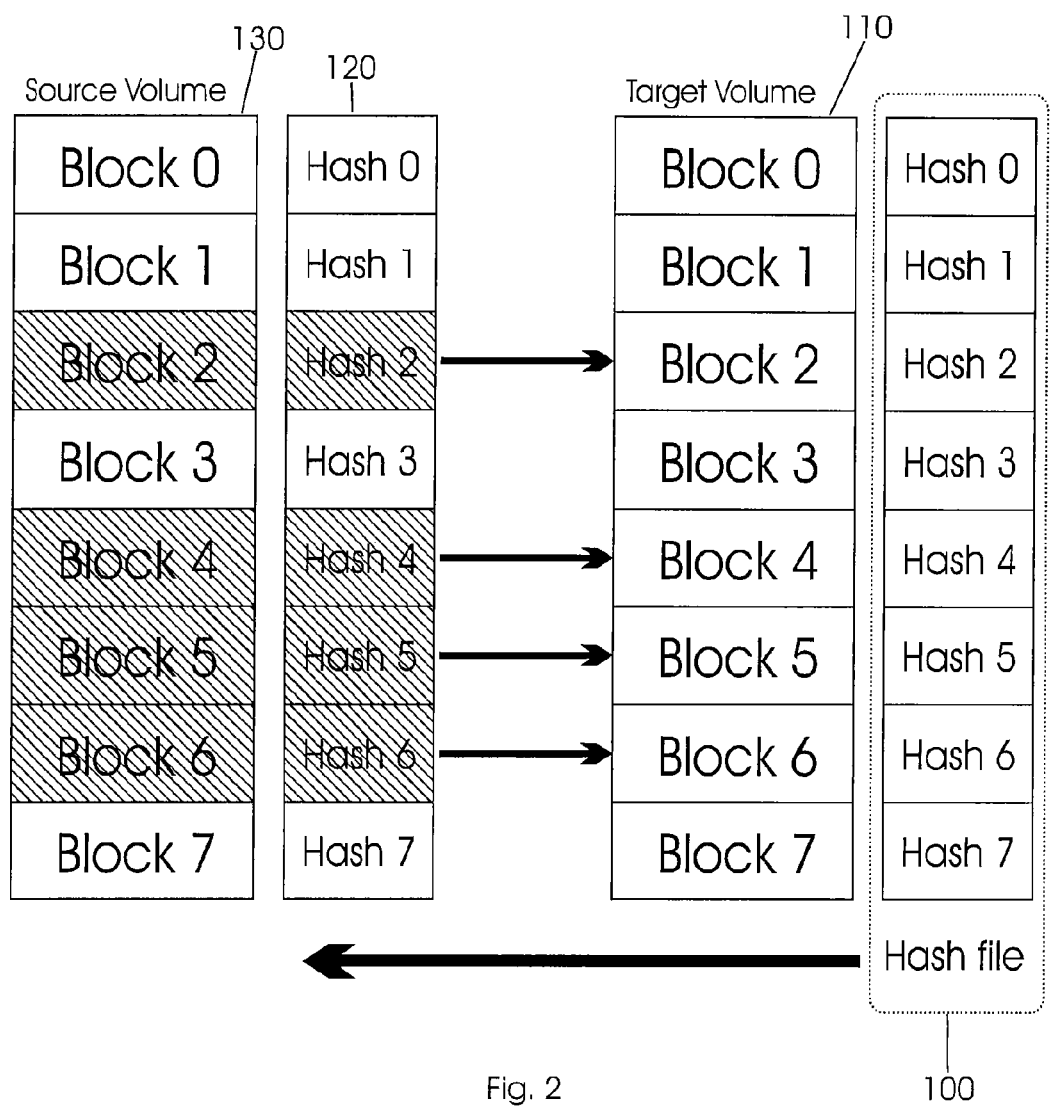
FIG. 2 provides a block diagram that helps illustrate an incremental backup procedure that operates in accordance with one or more embodiments of the present invention.

FIG. 2 provides a block diagram that helps to illustrate an incremental backup procedure that operates in accordance with one or more embodiments of the present invention. As indicated in FIG. 2, in accordance with the incremental backup procedure, hash file 100 for the latest prior backup on target volume 110 is retrieved from the target datastore and sent to the source machine. Then, in accordance with one or more such embodiments of the incremental backup procedure, matching hashes 120 are calculated for a snapshot of matching source volume 130. In the embodiment illustrated in FIG. 2, hashes for shaded blocks 2, 4, 5, and 6 are found to be different, and shaded blocks 2, 4, 5, and 6 are sent back to the target datastore along with their new hash values to complete an incremental update in accordance with the incremental backup procedure.

In accordance with one or more such embodiments, as successive incremental backup procedures are performed, it is not necessary to generate complete new copies of the backup VM. Rather, the backup VM can be managed using "VM snapshots" together with a set of "redo log files." A VM snapshot is taken (i.e., a timestamp is recorded) to establish the state of the backup VM at a point in time. Note that a "source snapshot" and a "VM snapshot" are used differently. Both start by setting a timestamp. As used in a backup procedure, a source snapshot (of a source machine volume) is temporary, and it is deleted after an incremental backup is completed. On the other hand, a VM snapshot is persistent and is not deleted unless and until it is no longer desired to retain a particular backup state (for example, after several months). Also, a VM snapshot manages the storage of pre- and post-snapshot data differently from the way a source snapshot manages the storage of pre- and post-snapshot data. In particular, after a VM snapshot is created, instead of copying pre-snapshot files to a "snapshot file" when changes or deletions occur, the pre-snapshot files are left untouched and the changes are written to one or more "redo log files." A redo log file is a collection of data in one or more files of a file system where file system writes are made after a VM snapshot. If a subsequent VM snapshot is created, a new redo log file is started at the time of that subsequent snapshot. It is then possible to "revert" a VM to any earlier state (i.e., a state marked by an earlier timestamp) by choosing which redo log file(s) to use. More generally, one can "switch" between any two snapshots by enabling and/or disabling the use of appropriate redo log file(s). The "active state" of a VM is the state represented by the snapshot reached after any reverting and switching which may have been conducted.

When a guest operating system of a VM requests a block of data, the virtualization software first checks the current redo log file. If the block of data is in the redo log file, the data are read and returned to the guest operating system. If not, the virtualization software next checks the immediate parent redo log file. This process of checking successive parent redo log files continues until the block of data is found. There is guaranteed to be a block of data available in a base VM snapshot if none is found in any of the subsequent redo log files (i.e., if no change has ever been made to that block). If and when it is necessary to revert to an earlier version, the virtualization software searches for blocks starting in the appropriate prior redo log file instead of the latest one, thereby ignoring changes which occurred after the timestamp of the earlier version.

In general, it is possible to create more than one redo log file associated with a particular VM snapshot. For example, after a first VM snapshot, one can create a first redo log file and even create subsequent snapshots and redo log files to track changes to a VM after the first VM snapshot. A user may then choose to revert to the first VM snapshot and start a second redo log file to track a different set of changes starting over from the first VM snapshot. To keep track of such multiple paths it is convenient to describe VM snapshots as arranged in a "snapshot tree," where the process of reverting a VM and starting an additional redo log file from a particular VM snapshot creates an additional branch of the tree.

In accordance with one or more embodiments of the present invention, changes associated with reconfiguring and customizing the latest copy of a source system volume to create a bootable VM must be undone before a subsequent incremental backup can be performed. In other words, the incremental backup should start from the most recent incremental or full copy of the source system volume, and the reconfiguration and customization steps should then be repeated on the updated copy of the source system volume. Any changes made to the incremental or full copy during a previous reconfiguration and customization would show up as differences that needed to be "corrected" on the next incremental backup, so they would be lost and have to be recreated anyway. Undoing those changes first can reduce the amount of data transferred during the incremental backup procedure. In accordance with one or more embodiments of the present invention, hashes used to identify changed files or blocks are not available in snapshots of bootable VMs, and one must revert to a state that includes the hash disk to make it available for retrieval by the incremental backup process.

The changes associated with reconfiguration and customization and hash disk removal can be stored in a redo log file. It is convenient, therefore, to describe both the copies of source system volumes and the backup VMs as part of a single snapshot tree. For convenience in describing portions of this snapshot tree, the term "VM snapshot" is used herein both to designate snapshots of bootable VMs and to designate snapshots of the copies of source machine volumes that may require reconfiguration and customization to create bootable VMs. Such copies or backups of source machines may not be VMs but rather intermediates in the process of creating VMs. Their snapshots are included in the snapshot tree so that they can be treated equally with the snapshots of bootable VMs as members of a family or tree of data connected by a series of change events, wherein some of those change events comprise the steps of reconfiguring and customizing necessary to create bootable VMs. Note that the changes in the hash file are also recorded in the snapshot tree and written into redo log files. As previously described in accordance with one or more embodiments of the present invention, this can be achieved by storing the hash file in a separate virtual disk. This virtual disk is associated with the backup VM whose changes are captured by the snapshots and redo log files outlined by the snapshot tree. This virtual disk, being present only in the intermediate states representing the copies of source volume data (i.e., those whose names begin with "Backup" as described below), is never actually accessible to the guest operating system of a bootable VM.

While embodiments of the present invention are described herein, wherein the hash data are stored in a hash file on a virtual disk associated with the backup VM, other configurations can also be used to store the hash data. For example, the hash data can be stored in storage separate from that used to store the backup VM, and the changes in the hash data from one incremental update to the next can be recorded by any suitable means and in any suitable location, either the same, or different from that used to record changes in the backup VM, as long as the incremental update procedure can access a set of hash data that can be properly matched to a set of blocks or files for a particular incremental update.

Figure 3:
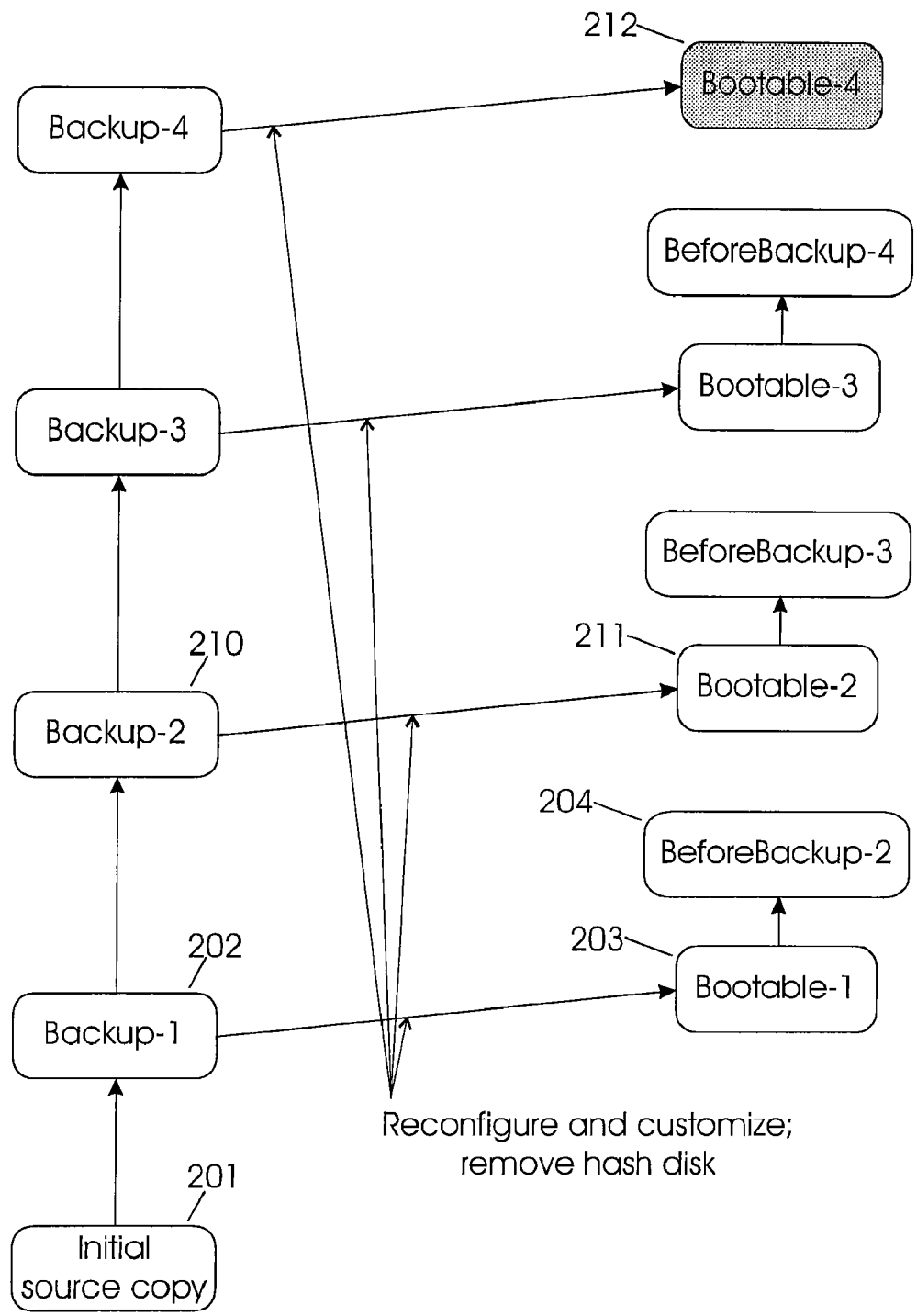
FIG. 3 provides a "snapshot tree" that shows all VM snapshots created after three incremental backup procedures have been performed in accordance with one or more embodiments of the present invention.

FIG. 3 shows a snapshot tree with all VM snapshots created after three incremental backup procedures have been performed in accordance with one or more embodiments of the present invention. The left-hand column (i.e., the "trunk") of the snapshot tree of FIG. 3 shows successive incremental backups of the source volume(s) where no reconfiguration or customization has been carried out thereon. In accordance with one or more embodiments of the present invention, these successive incremental backups of the source volumes are stored as successive VM snapshots of data which includes copies of source volumes and associated hash disks (if used). These VM snapshots are typically assigned names herein beginning with "Backup" as shown in FIG. 3. (Note the distinction between a "Backup VM 5 snapshot" [uppercase 'B'] which is a VM snapshot of one of these copies of source system volumes and a "backup VM" [lowercase 'b'] which is a bootable VM, whose evolution can be represented with the aid of a snapshot tree.) As set forth above, successive Backup VM snapshots (timestamps) and redo log files capture changes from one backup to the next.

The right-hand column of the snapshot tree of FIG. 3 shows VM snapshots of bootable VMs. The "Bootable VM snapshots" are VM snapshots of the bootable VMs created when the hash disk has been removed and any required reconfiguration and customization has been carried out on one of the Backup VM snapshots. The "BeforeBackup VM snapshots" further capture any user-implemented changes applied to application programs which are installed on the bootable VM. In accordance with one or more embodiments of the present invention, a redo log file records file system changes required to convert a Backup VM snapshot on the left-hand column to a corresponding Bootable VM snapshot in the right-hand column. Further, as is described in more detail below, after each incremental backup procedure, the most recent (i.e., the top-most) Bootable or BeforeBackup VM snapshot (i.e., Bootable-4 212 in the right-hand column of FIG. 3) is the most up-to-date bootable VM snapshot, and it can be powered up if and when it is needed.

Initial source copy 201 in the left-hand column of FIG. 3 is a copy of the source system volume(s) specified for backup and a hash disk. If the source system is a VM, then initial source copy 201 may be a bootable VM; however, if the source system is a physical machine, it will not be. Nevertheless, even if the source system is a VM, some reconfiguration and customization may be required to enable it to run in a particular environment.

In accordance with one or more embodiments of the present invention, a first VM snapshot (Backup-1 202) is created after initial source copy 201 is complete. (For simplicity, time stamps mentioned below are replaced with sequence numbers.) This first VM snapshot is used as a base for subsequent VM snapshots, i.e., it is the base or root of the snapshot tree. Note that, in accordance with one or more such embodiments, forming a snapshot comprises setting a timestamp and allocating a redo log file-no entries in the redo log file are made at this point in time. In accordance with one or more such embodiments, the name of the snapshot can include an appended timestamp to make it unique, although other algorithms for creating unique names can also be used. For example, and without limitation, any VM snapshot on the left-hand side of FIG. 3 can be named "Backup-[timestamp]." Each Backup VM snapshot is used as a starting point for the next incremental backup via a set of redo log files. Each backup VM snapshot is associated with an additional redo log file (on a different branch of the snapshot tree) for creating a corresponding bootable VM. The Backup VM snapshots are typically not bootable and should never be booted and run.

In accordance with one or more embodiments of the present invention, to create a bootable backup VM, the hash disk is removed from Backup-1 (VM snapshot) 202 and any necessary reconfiguration and customization transformations are applied thereto. As set forth above, these reconfiguration and customization transformations cause change blocks to be created, and in accordance with one or more embodiments of the present invention, these change blocks are stored in the redo log file created at the time of Backup-1 VM snapshot 202. In accordance with one or more such embodiments, at the time every VM snapshot is created, a new redo log file is associated with it to record changes that occur after the time of the snapshot. As a final step in preparing a bootable VM, once the necessary reconfiguration and customization transformations are complete, a Bootable VM snapshot (for example, Bootable (VM snapshot) 203 of FIG. 3) is created with a unique name. For example, this Bootable VM snapshot can be named "Bootable-[timestamp]," where the timestamp would be the same as that of the corresponding Backup VM snapshot since they reference the same backup event. Thus, for every incremental backup VM created, at least two snapshots are created, one before and one after the reconfiguration and customization (and hash disk removal) procedure.

In accordance with one or more embodiments of the present invention, when it is time to perform the next incremental backup procedure: (a) the snapshot tree is "reverted" (i.e., the VM represented by the snapshot tree is reverted) to the most recent Backup VM snapshot (for example, Backup-1 202 of FIG. 3); (b) a new redo log file is created for that Backup VM snapshot; (c) a new source snapshot is created to freeze the state of the source system volume(s) for the incremental backup (the source system may continue to modify the source system volume(s), and post-snapshot modifications will be captured in the following incremental backup); (d) the hash file from the most recent Backup VM snapshot is transferred to the source system; (e) hashes from the hash file are compared to newly computed hashes for the source system, and change blocks and hashes are transferred and written into the new redo log file; (f) when all change blocks and hashes are transferred, a new Backup VM snapshot and redo log file (for example, Backup-2 210 of FIG. 3) are created; (g) the hash disk is removed, reconfiguration and customization transformations are applied thereto to the new Backup VM to create a new bootable VM and (h) a VM snapshot (for example, Bootable-2 211 of FIG. 3) is created of the new bootable VM.

A user or system administrator can boot from a Bootable VM snapshot to test it to make sure that it works properly. For example, the user may need to test applications to identify scripts needed to prepare the VM for a takeover in the event the source system goes down. Such scripts may be needed to adapt particular applications to the environment in which the VM will run in the event that they were not automatically adapted by the reconfiguration and customization transformation steps that were a part of creating the bootable VM. Once the reconfiguration, customization, and adaptation steps are complete, it is generally possible to power on the resulting VM quickly, and the overall system downtime from a failure of the source system to the availability of a replacement VM can be just a few minutes.

Once testing is complete, the bootable VM is typically shut down until it is needed for recovery purposes. Further, any scripts that were created to adapt applications can be recorded for reuse in conjunction with future Bootable VM snapshots. In some cases, it is also possible to implement the functionality of the scripts directly in the source machine so that they are no longer needed.

To prevent loss of user changes to a Bootable VM snapshot, in accordance with one or more embodiments of the present invention, the incremental backup procedure creates yet another Bootable VM snapshot, referred to herein as BeforeBackup VM snapshot (for example, BeforeBackup-2 204 of FIG. 3), on top of a Bootable VM snapshot (for example, Bootable-1 203 of FIG. 3) before reverting to the latest Backup snapshot. The BeforeBackup VM snapshot can be given another unique name such as "BeforeBackup-[timestamp]." The timestamp for this snapshot can be the same as the timestamp for the Backup VM snapshot that is about to be created. However, in accordance with one or more such embodiments, in certain cases, it may not be necessary to create the BeforeBackup VM snapshot. For example, if the Bootable VM snapshot has never been booted, or if it has, but it was only tested but not reconfigured in any way, then no changes need to be captured. Since a VM snapshot will have an associated redo log file that records all changes that take place after the snapshot time, if the redo log file for the current Bootable VM snapshot is empty, there is no need to create the corresponding BeforeBackup VM snapshot. However, it is not always straightforward to determine whether the redo log file for a snapshot is empty or not. To work around this, in accordance with one or more embodiments of the present invention, the incremental backup procedure can analyze the current Bootable VM snapshot before starting an incremental backup procedure. If it can determine that the current Bootable VM snapshot is not the same as one of the Bootable VM snapshots, then a BeforeBackup VM snapshot is needed. Some systems provide a "changeID" for a disk, indicating which files have changed after a particular timestamp, or alternatively, a list of change blocks after a particular timestamp. If one of these resources is available, the incremental backup procedure can skip creating the BeforeBackup VM snapshot if the current Bootable VM snapshot has never been modified (i.e., if its redo log file has not been changed since it was created).

Figure 4:
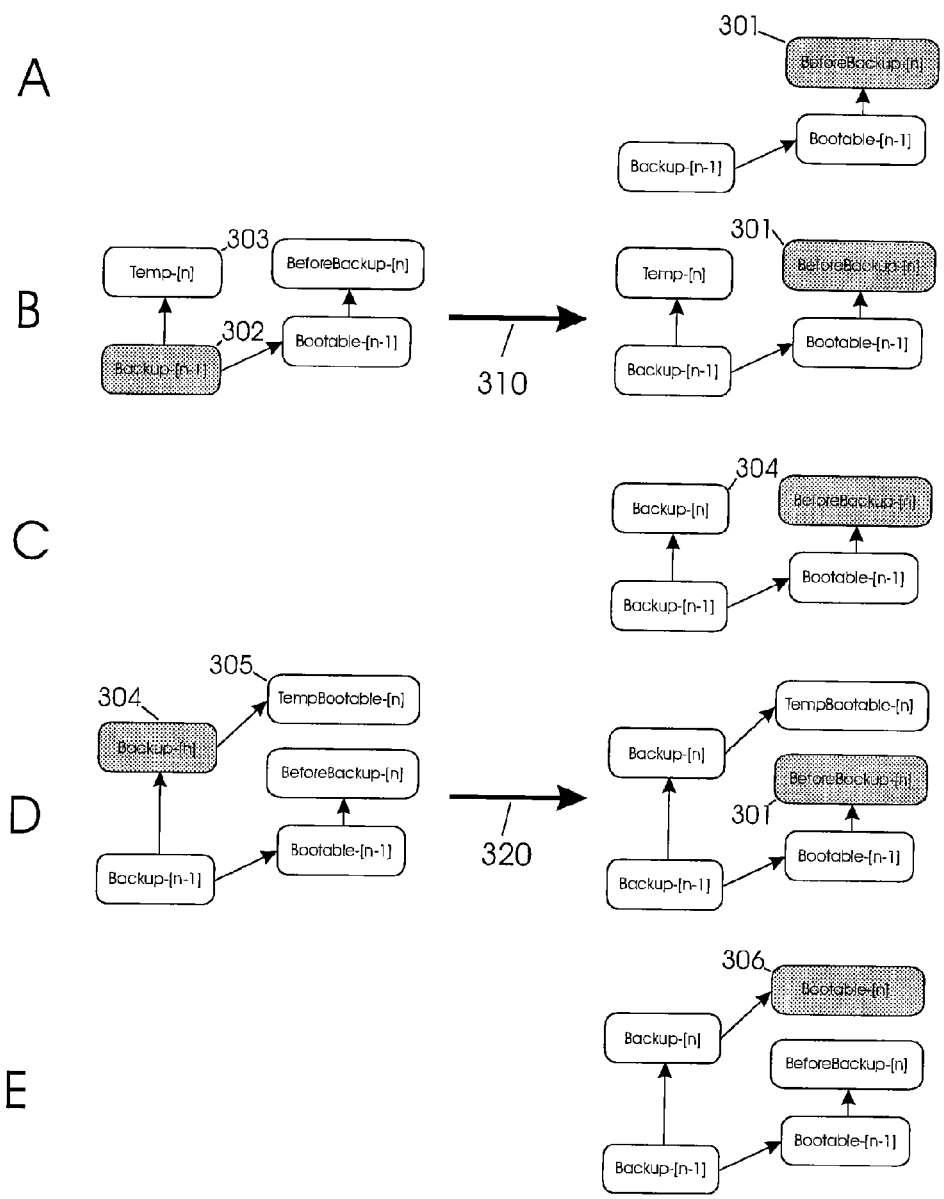
FIG. 4 is a sequence of frames that show changes to a portion of a VM snapshot tree during one incremental backup procedure step that operates in accordance with one or more embodiments of the present invention.

As described so far, during the time that an incremental backup procedure is being carried out, for example, by transferring the hash file and copying updated files or blocks, the "active state" of the snapshot tree (i.e., the active state of the VM represented by the snapshot tree) is that of the most recent Backup VM snapshot. As such, that state does not represent a bootable VM. It can take significant time to transfer all change blocks for the incremental backup. As such, it can be desirable to have a bootable VM ready to use in the event of source system failure during the incremental backup procedure. To provide such a bootable VM, in accordance with one or more embodiments, the active state of the snapshot tree is reverted and switched so as to keep it in the latest bootable state as much as possible. Essentially, the state of the snapshot tree is reverted to the most recent Backup VM snapshot only to create a new temporary VM snapshot, and then immediately switched back to the current Bootable or BeforeBackup VM snapshot. Once the next set of modifications is written into the redo log file for the temporary snapshot, that temporary snapshot can be renamed, and the next step (if any) can proceed. This sequence is illustrated in FIG. 4, where steps to create a "Bootable-[n]" VM snapshot are illustrated. In particular, FIG. 4 shows a sequence of steps and sub-steps as explained below that illustrate a portion of a backup VM snapshot tree during one incremental backup procedure that operates in accordance with one or more embodiments of the present invention. Each of the five lettered steps of FIG. 4 comprises either one or two sub-steps, each of which illustrates a segment of the snapshot tree of FIG. 3. At each step or sub-step, the active state of the snapshot tree is marked by shading. Steps B and D illustrate the brief reverting and immediate switching back to the most recent bootable state.

As shown in FIG. 4, first, at Step A, "Before-Backup-[n]" (VM snapshot) 301 is created from Bootable [n−1]. Next, at Step B, the active state of the snapshot tree is reverted to "Backup-[n−1]" 302 and new VM snapshot 303 (which is called "Temp-[n]") is created. Then, as indicated by arrow 310, the active state of the snapshot tree is switched immediately back to Before-Backup-[n] 301. Next, at Step C, the incremental backup procedure copies change blocks and hashes to the redo log file for Temp-[n], which is then renamed "Backup-[n]" 304. Next, at Step D, the active state of the snapshot tree is reverted to Backup-[n] 304, and another new Bootable VM snapshot 305 (which is called "TempBootable-[n]") is created. Then, as indicated by arrow 320, the active state of the snapshot tree is again switched immediately back to Before-Backup-[n] 301. Next, at Step E, reconfiguration and customization steps necessary to create "Bootable-[n]," plus the removal of the hash disk, are implemented by writing to the redo log file for TempBootable-[n], which is then renamed to "Bootable-[n]" 306. Finally, also at Step E, the active state of the snapshot tree is switched to Bootable-[n] 306, and the incremental backup procedure is complete.

As one can readily appreciate from the above, the use of temporary VM snapshots, together with reverting and switching of the active state of the snapshot tree, allows the active state of the snapshot tree to remain in the most recent bootable state for all but brief moments when temporary VM snapshots are created. Further, if, for some reason, an incremental backup procedure fails to complete, either a "Temp" or a "TempBootable" snapshot will exist, and suitable steps can be taken to redo or complete the incremental backup procedure.

Referring to FIG. 3, in accordance with one or more embodiments of the present invention, a hash disk is present only in Backup VM snapshots on the left-hand side of the snapshot tree, and all snapshots on the right-hand side of the snapshot tree do not include a hash disk. In addition, a VM user cannot change or even see the hash disk, since a VM user always uses a VM snapshot from the right-hand side. Further, if the VM user manually switches the active state of the snapshot tree to one of the Backup VM snapshots, the resulting VM will normally not be bootable. Even if the user manages to boot a VM from one of the Backup VM snapshots, any changes will be automatically discarded the next time an incremental backup is made, since the changes would not be captured in any redo log file. As such, the incremental backup procedure is resistant to possible accidental or malicious changes to its stored data.

In accordance with one or more embodiments of the present invention, by maintaining a snapshot tree, a user can boot a VM using any "Bootable" or "BeforeBackup" VM snapshot. Typically, the selection of a particular snapshot to use is facilitated by a graphical user interface which can present the user with appropriate guidance and choices. This can be important for recovering from a problem that is not detected immediately. For example, if the source system is infected with a virus, but the presence of the virus is discovered only several days later, the virus is likely to be present in all recent incremental backups. The user can boot preceding snapshots, one at a time, until one is found which does not contain the virus.

Typically, users do not need to keep snapshots indefinitely. The incremental backup procedure can limit the number of "Backup" VM snapshots created to a user-selectable number. A typical default number of incremental backups can be set to 10, for example, or the number of incremental backup procedures scheduled in some time interval such as one or several days. Alternatively, shorter- and longer-term limits can be set, for example, by keeping up to a selectable number of most recent backups plus one backup per day for a selectable number of days. All Backup VM snapshots beyond these limits can be collapsed after each successful incremental backup procedure, and the corresponding Bootable and BeforeBackup VM snapshots can be automatically removed and discarded. In accordance with one or more embodiments of the present invention, selection of user-configurable options can be facilitated by a graphical user interface providing guidance and selection options for configuration and customization of backup procedure options.

In one or more embodiments, hashes are calculated to determine which blocks to copy. However, the hash-based approach to determining which blocks need to be copied requires an entire source volume to be read into memory so that the hash value of each block can be calculated. Obviously, only used blocks need to be read, but even just the used blocks can constitute a large amount of data to read. For a large disk it can take a long time to read all the data. Further, the time required is proportional to the total size of all files on the volume, not the size of modified blocks. Thus, source volume hash calculations can prevent the incremental backup procedure from achieving an acceptably small recovery point objective (i.e., RPO, which is an amount of data loss measured in time that is a target maximum time). For backup operations, RPO determines an acceptable maximum interval between consecutive backups.

In accordance with one or more embodiments of the present invention, a bitmap driver is used to determine which blocks to copy. The bitmap driver can be run on the source system to maintain a bitmap that records all blocks on all volumes that have been modified since a particular start time. Multiple bitmaps can be maintained to track changes from different start times. The incremental backup procedure can use these bitmaps to determine which blocks need to be transferred instead of reading every used block on the source volume(s) and calculating hashes. The time required to do so will depend only on the amount of changed data, and thus a much shorter RPO can be achieved.

Even if the process uses a bitmap driver, it can still be advantageous to calculate and maintain hash values for all blocks so that the process can fall back to the hash-based method of determining changed blocks in case the bitmap driver is not available or malfunctions. For the incremental backup procedure to use the information provided by the bitmap driver, the driver must guarantee that if a block is marked as unmodified in the driver's bitmap, then the block has indeed not been modified since the time the driver started tracking changes. Without this guarantee, the incremental backup procedure cannot produce a consistent backup image of the source system. In most cases, the driver can and does so guarantee, but there are several cases when the driver can potentially miss a write operation and fail to provide the necessary guarantee. For example, one implementation of the bitmap driver keeps the bitmap of modified blocks in volatile memory. In this implementation, if the source system is rebooted or crashes, the driver cannot provide consistent information, and should not be relied upon. The driver implementation could be changed to have persistent bitmaps preserved across reboots, but it would still be vulnerable to system crashes. A system crash could damage the persistent bitmap and even the underlying file system, thereby making the bitmap unreliable. It should be noted that non-persistent bitmaps in volatile memory are faster to calculate and do not add much overhead to the source system. Persistent bitmaps would require the driver to write information to the file system (typically located on a disk drive), which would drain more resources from the source system.

In accordance with one or more embodiments of the present invention, the bitmap driver runs when the system starts, and continues running until the system is shut down or restarted. However, before the operating system is started, the system is controlled by the BIOS, and the driver is not yet running. Most users do nothing during this time, but it is possible to boot into a different operating system either from a CD or a network. There is no guarantee that this alternate operating system (or the user) will not attempt to write to the volumes that should be monitored by the bitmap driver. If this happens, the information provided by the bitmap driver will be inconsistent and should not be used for incremental backup.

The hash-based approach is operating system agnostic, does not require exclusive control of the source system, can handle any reboots/crashes of the source system and any multiboot environment, and places no strain on the source system between incremental backups. However, because it requires all used blocks to be read for each incremental backup, it typically cannot achieve as small an RPO as the bitmap driver.

In contrast, the bitmap driver approach does not require reading all used blocks, reports changed blocks directly, and can achieve a very small RPO. At the same time, it requires operating-system-specific drivers, may be affected by reboots, drains resources from the source between incremental backup procedures (even more so for persistent bitmaps), and cannot handle crashes of the source system.

The potential for a very short RPO makes it desirable to use a bitmap driver whenever possible. However, given the number of possible failure modes, it is typically not desirable to rely on a bitmap driver exclusively. In accordance with one or more embodiments of the present invention, the incremental backup procedure can use the bitmap driver whenever it can be relied on and fall back to the hash-based approach to guarantee the consistency of each incremental backup if any events may have occurred to invalidate the bitmap. The incremental backup procedure can check for the occurrence of any reboot events or other events that could invalidate the bitmap, and if any such event has occurred since the last incremental backup, the incremental backup procedure can use the hash data instead.

Figure 5:
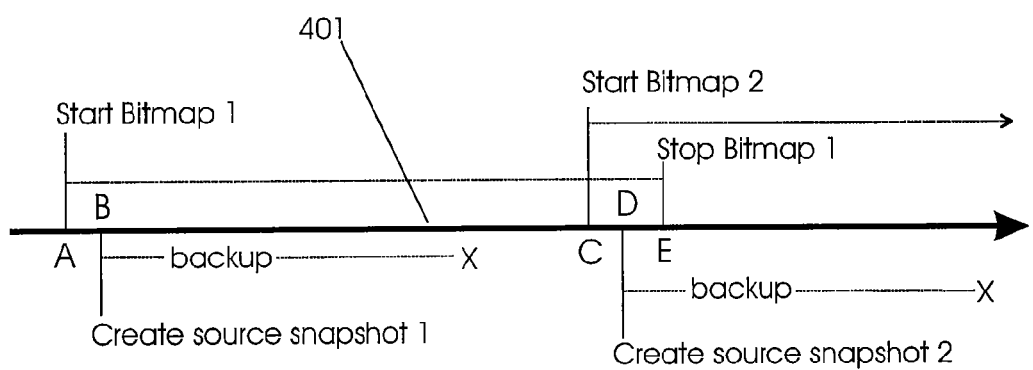
FIG. 5 is a timeline that helps illustrate a method of starting and stopping storing change bitmaps when using a bitmap driver in accordance with one or more embodiments of the present invention.

In accordance with one or more embodiments of the present invention, a bitmap driver records a change state of blocks after a particular start time. When used with incremental backups, a new start time is set and a new bitmap is created for each incremental backup. Further, the previous bitmap is frozen ("stopped"). Proper sequencing of starting and stopping times for each bitmap relative to the source snapshot times is important to ensure that all changes are captured. Typical CPUs simulate simultaneous parallel computation by timesharing, and it is possible that changes could be made to a source volume by another process in between the time that one bitmap was frozen and the next was started. One embodiment of a method that ensures all changes are captured is described below in conjunction with timeline 401 of FIG. 5. As shown in FIG. 5, the time intervals of successive bitmaps overlap slightly. In particular, as shown in FIG. 5, Bitmap 1 is started at time A immediately prior to the creation of a source snapshot used for one full or incremental backup at time B. (While the incremental backup procedure does nothing between time A and time B, it is possible that other running processes may cause a finite delay between time A and time B.) Thereafter, for each succeeding incremental backup, a new bitmap is created. In particular, Bitmap 2 is started at time C immediately prior to the creation of a new source snapshot for the next incremental backup at time D. As further shown in FIG. 5, changes to the previous bitmap, i.e., Bitmap 1, are stopped (i.e., no more changes are captured) at time E which is immediately after the creation of the new source snapshot at time D. While the time interval between time C and time E is typically short, it is non-zero, and the source system may be busy with other applications that can modify a few blocks on one or more source volumes during that interval. Because there can be a slight overlap in the change information stored in successive bitmaps, there can be a slight duplication of blocks transferred during successive incremental backups. The number of such duplicate block transfers will generally be small compared to the total number of blocks transferred, so the additional time required will be negligible.

Figure 6:
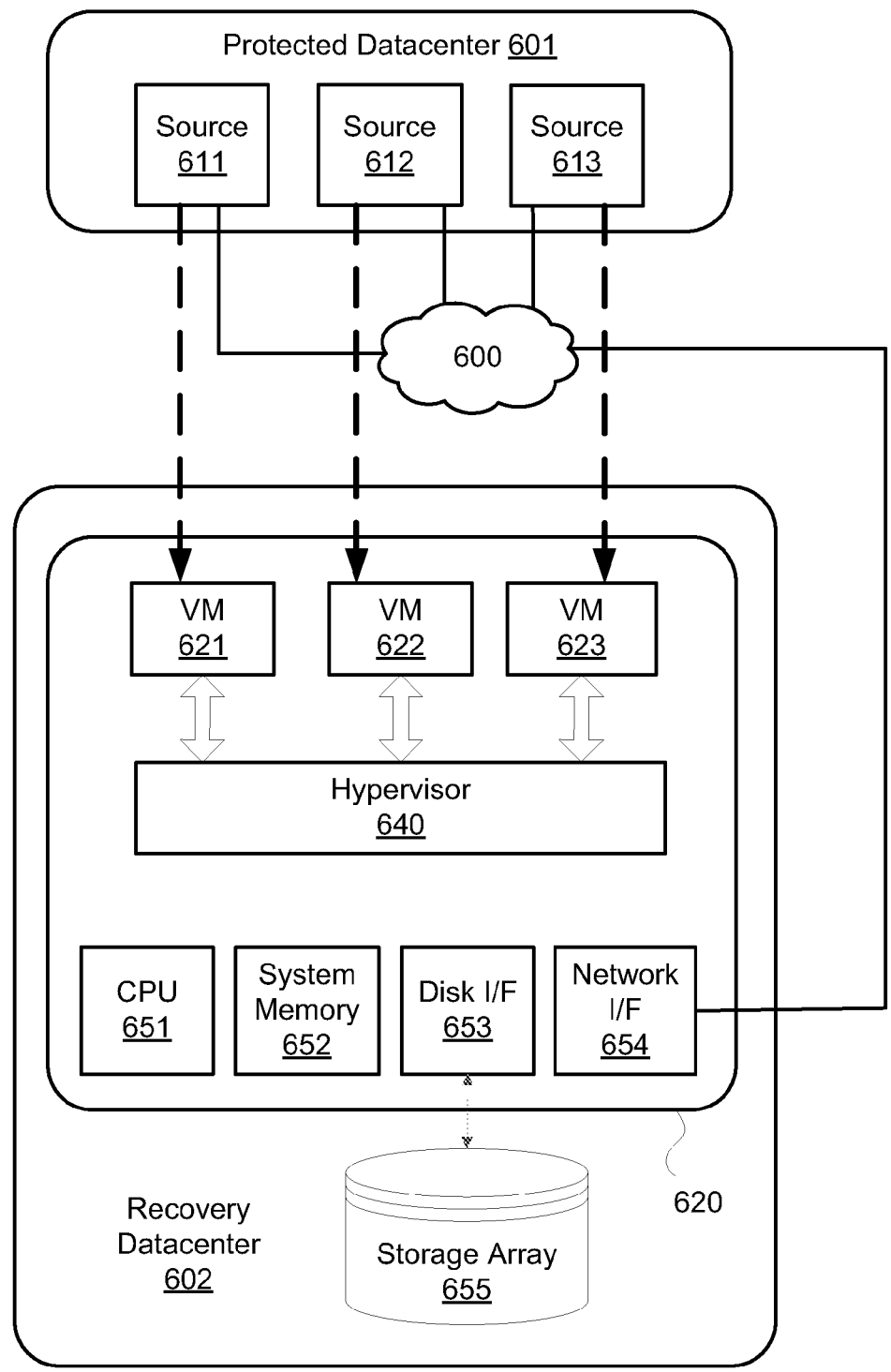
FIG. 6 is a block diagram of a physical-to-virtual disaster recovery system in which one or more embodiments of the invention can be implemented.

FIG. 6 is a block diagram of a physical-to-virtual disaster recovery (P2VDR) system in which one or more embodiments of the invention can be implemented. Although embodiments of the invention are illustrated in the context of P2VDR, persons skilled in the art will recognize that the invention is applicable to other contexts, such as regular backups. The P2VDR system includes two datacenters, datacenter 601 and datacenter 602, in separate geographical locations that are connected through a network 600. The recovery datacenter, which is datacenter 602, is far enough from the protected datacenter, which is datacenter 601, to qualify for disaster recovery. In one embodiment, the geographical separation is 100 km.

Protected datacenter 601 houses source machines referred to herein as source 611, source 612, and source 613. VM 621 is a backup of source 611. VM 622 is a backup of source 612. VM 623 is a backup of source 613. VM 621, VM 622, and VM 623 each run in a computer system 620 that is housed in recovery datacenter 602. In the embodiment of FIG. 6, three virtual machines and three source machines are shown. However, the invention is applicable to any number of virtual machines and source machines.

Computer system 620 is the host system for VM 621, VM 622, and VM 623, and has conventional hardware resources of a computing device, such as CPU 651, system memory 652, a disk interface 653, and network interface 654, that are shared by VM 621, VM 622, and VM 623. Examples of disk interface 653 are a host bus adapter and a network file system interface. An example of network interface 654 is a network adapter. The virtual machines, VM 621, VM 622, and VM 623, run on top of a hypervisor (or virtual machine monitor) 640, which is a software interface layer that enables sharing of the hardware resources of computer system 620 by the virtual machines. Hypervisor 640 may run on top of the host computer's operating system or directly on hardware components of the server platform. Data storage for computer system 620 is served by a storage array 655 (e.g., a disk array).

Figure 7:
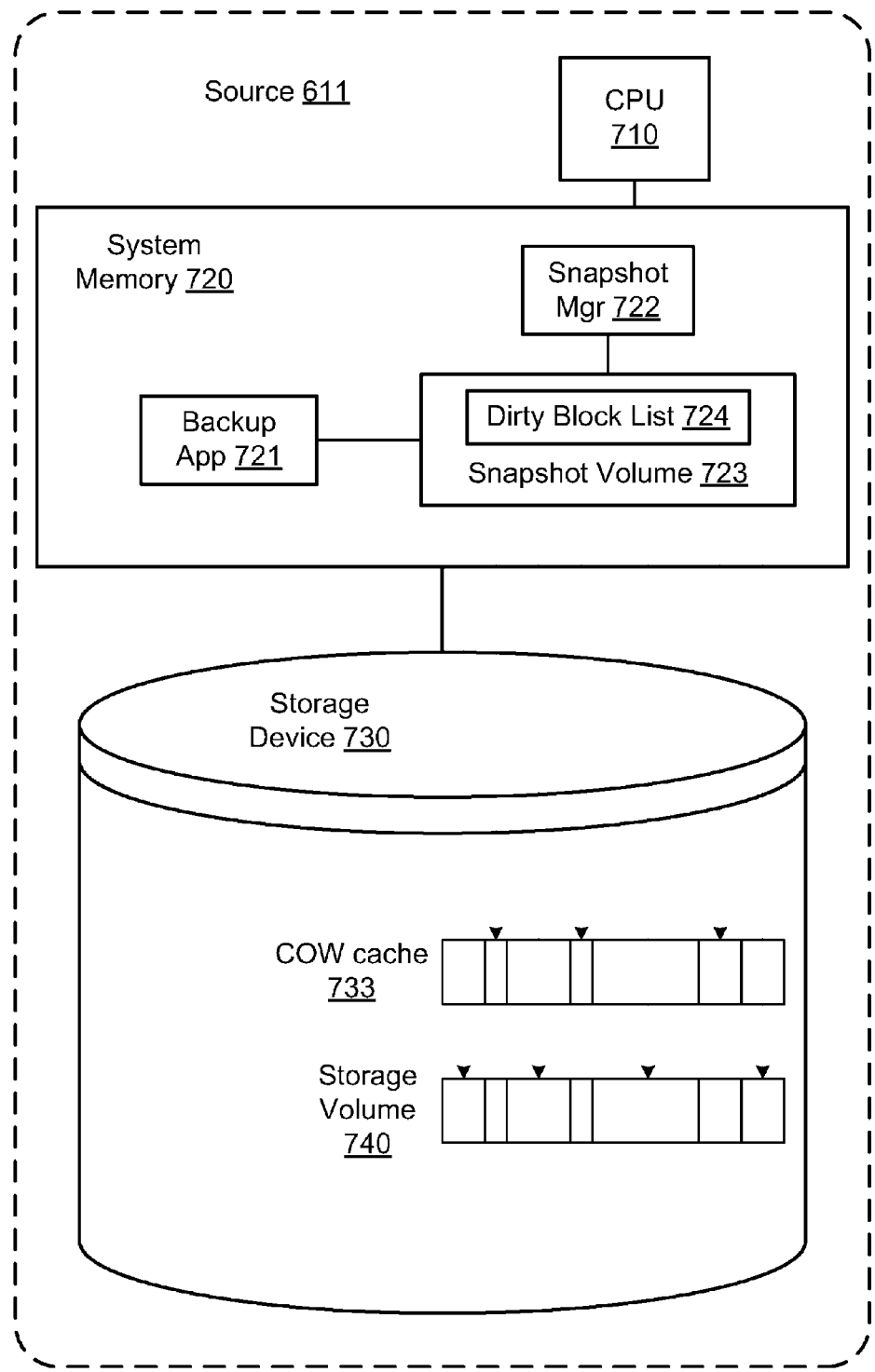
FIG. 7 is a block diagram of a source machine that is configured to handle incremental physical-to-virtual conversion in the system of FIG. 6.

FIG. 7 is a block diagram of a source machine that is configured to handle incremental physical-to-virtual conversion in the system of FIG. 6. The source machine shown in FIG. 7 is source 611. Source 611 includes CPU 710, system memory 720, and storage device 730, and is configured with a backup application 721 and a snapshot manager 722. In accordance with a backup schedule, backup application 721 invokes snapshot manager 722 to generate a snapshot of storage volume 740 at various points in time. When snapshot manager 722 generates a snapshot, it exposes a snapshot volume 723 and allocates a dirty block list 724 and a COW (Copy-On-Write) cache 733. COW cache 733 is used to store the original content of those blocks of storage volume 740 that undergo any changes subsequent to the point in time the snapshot was generated. COW cache 733 grows over time as writes are issued to other blocks of storage volume 740. Snapshot manager 722 maintains dirty block list 724 to keep track of what blocks of storage volume 740 have changed since the snapshot was taken. For example, when a write is issued to one or more blocks of storage volume 740, snapshot manager 722 updates dirty block list 724 to include location references to these blocks. When backup application 721 needs to read the snapshot, backup application 721 reads snapshot volume 723. These and other reads of snapshot volume 723 are managed by snapshot manager 722 based on dirty block list 724. If a block being read is not in dirty block list 724, snapshot manager 722 causes the read to occur directly from storage volume 740. If a block being read is in dirty block list 724, snapshot manager 722 causes the read to occur from COW cache 733.

Figure 8:
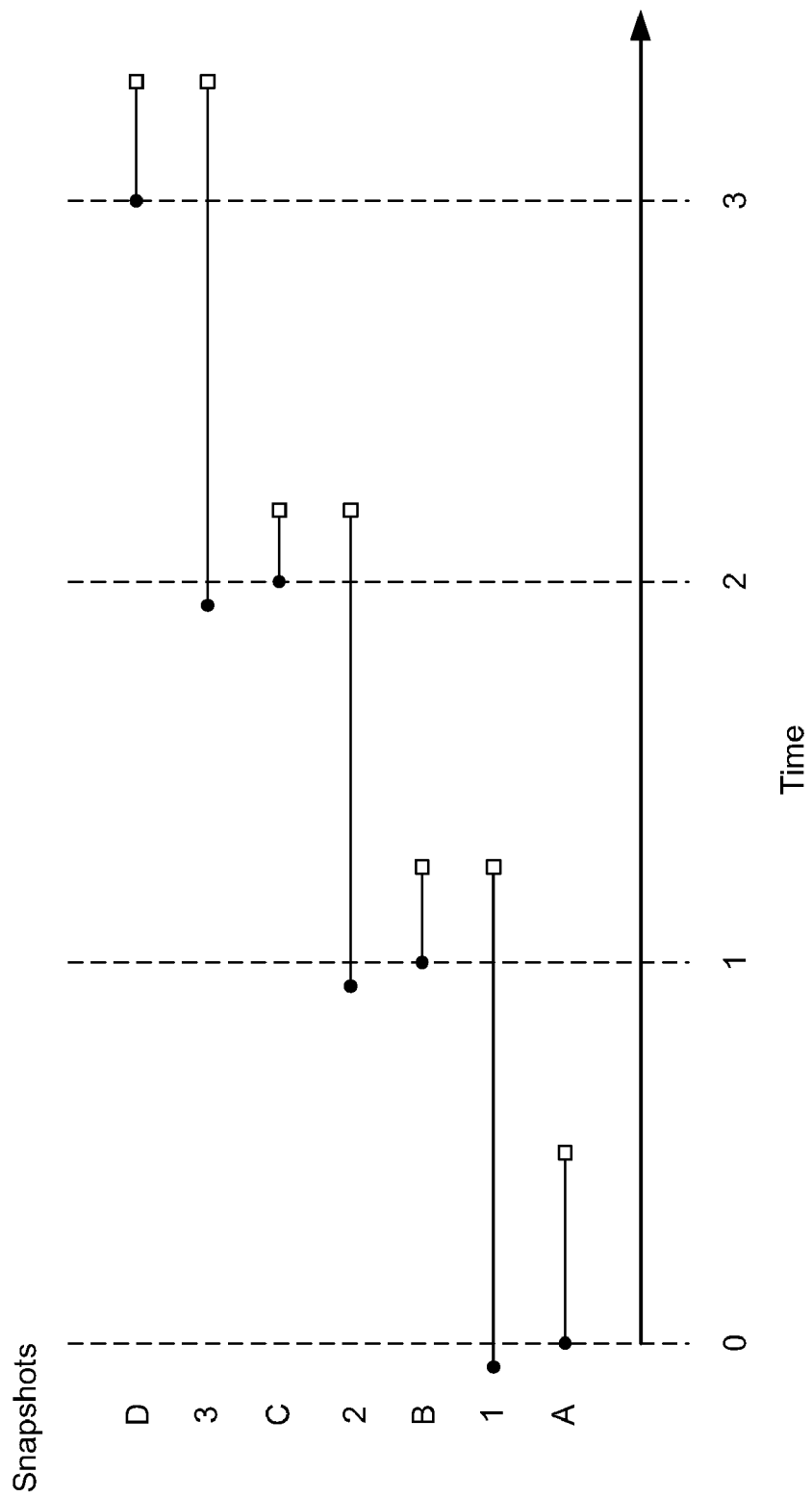
FIG. 8 is a timeline illustrating a process for performing backups in accordance with an embodiment of the invention.

The timeline shown in FIG. 8 illustrates how backup application 721 uses snapshot manager 722 to carry out backups according to an embodiment of the invention. For simplicity, backup of only storage volume 740 is illustrated in FIG. 8. However, it should be recognized that the procedure described herein applies to any of the storage volumes of storage device 730.

In FIG. 8, a full backup is carried out at time 0 and incremental backups are carried out subsequently, e.g., at time 1, time 2, etc. At time 0, backup application 721 invokes snapshot manager 722 to generate a snapshot of storage volume 740, referenced in FIG. 8 as Snapshot A. After this, snapshot manager 722 tracks writes to blocks of storage volume 740. If a write is issued to one or more blocks of storage volume 740, snapshot manager 722 reads these blocks from storage volume 740 and copies these blocks into a COW cache associated with Snapshot A. In this manner, the content of the blocks of storage volume 740 that are about to be overwritten are preserved in the COW cache. In addition, snapshot manager 722 updates a dirty block list associated with Snapshot A to include location references to these blocks.

Backup application 721 carries out a full backup of storage volume 740 by reading the blocks of snapshot volume for Snapshot A and copying them into a backup volume. If a block being read by backup application 721 is in the dirty block list associated with Snapshot A, e.g., those blocks that are written to while the full backup process is being carried out, snapshot manager 722 causes the read to occur from the COW cache associated with Snapshot A. If a block being read by backup application 721 is not in the dirty block list associated with Snapshot A, snapshot manager 722 causes the read to occur directly from storage volume 740. After full backup is completed, Snapshot A is deleted.

For the benefit of the next backup, which is an incremental backup occurring at time 1, backup application 721 invokes snapshot manager 722 to generate a snapshot of storage volume 740 just prior to time 0, referenced in FIG. 8 as Snapshot 1. This snapshot is maintained past time 1. Snapshot 1 is used to track changes to storage volume 740 occurring between time 0 and time 1. The reason for generating the snapshot prior to time 0 and maintaining it past time 1 is to ensure that all changes to storage volume 740 between time 0 and time 1 are reflected in the dirty block list of this snapshot. At time 1, backup application 721 invokes snapshot manager 722 to generate another snapshot of storage volume 740, referenced in FIG. 8 as Snapshot B.

For the incremental backup of storage volume 740 at time 1, backup application 721 examines the dirty block list associated with Snapshot 1. The dirty block list for a snapshot can be retrieved through an application programming interface (API) or, if such API is not available, by going directly to the COW cache for the snapshot and parsing the COW cache to reconstruct the dirty block list. The dirty block list associated with Snapshot 1 indicates the blocks that have changed during a time interval that includes the time period of interest, i.e., time period between time 0 and time 1. Backup application 721 then reads the blocks that are identified in the dirty block list associated with Snapshot 1, i.e., the changed blocks, from snapshot volume for Snapshot B and copies them into the backup volume. If a block being read by backup application 721 is in the dirty block list associated with Snapshot B, e.g., those blocks that are written to while this incremental backup process is being carried out, snapshot manager 722 causes the read to occur from the COW cache associated with Snapshot B. If a block being read by backup application 721 is not in the dirty block list associated with Snapshot B, snapshot manager 722 causes the read to occur directly from storage volume 740. After all the changed blocks have been copied from the snapshot volume for Snapshot B to the backup volume, the incremental backup process is completed, and Snapshot 1 and Snapshot B are deleted.

The incremental backup process continues in the same manner described above for time period between time 0 and time 1 for the time periods between time 1 and time 2 using Snapshots 2 and C, between time 2 and time 3 using Snapshots 3 and D, etc.

Figure 9:
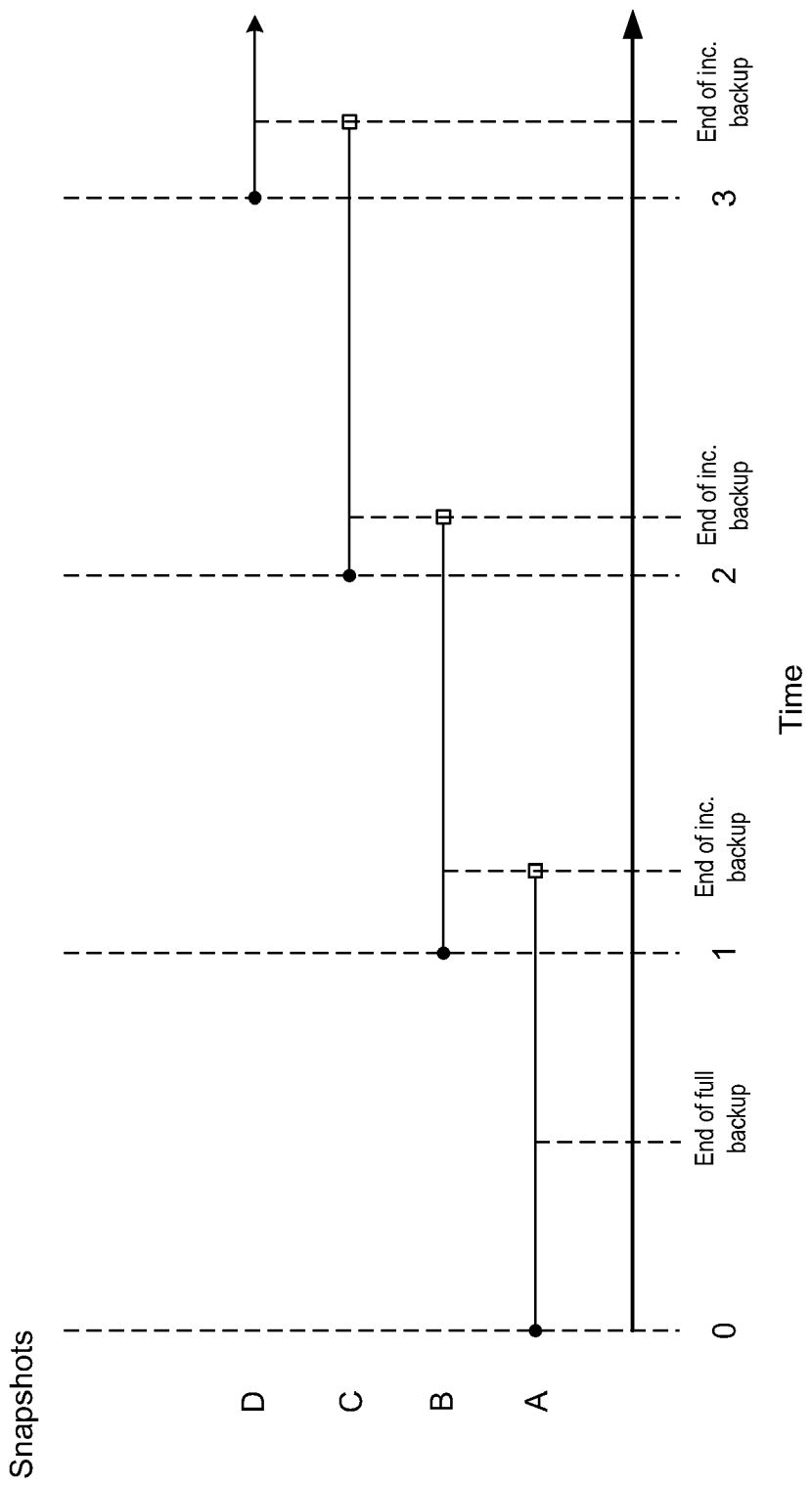
FIG. 9 is a timeline illustrating a process for performing backups in accordance with another embodiment of the invention.

The timeline shown in FIG. 9 illustrates how backup application 721 uses snapshot manager 722 to carry out backups according to another embodiment of the invention. For simplicity, backup of only storage volume 740 is illustrated in FIG. 9. However, it should be recognized that the procedure described herein applies to any of the storage volumes of storage device 730.

In FIG. 9, a full backup is carried out at time 0 and incremental backups are carried out subsequently, e.g., at time 1, time 2, etc. At time 0, backup application 721 invokes snapshot manager 722 to generate a snapshot of storage volume 740, referenced in FIG. 9 as Snapshot A. After this, snapshot manager 722 tracks writes to blocks of storage volume 740. If a write is issued to one or more blocks of storage volume 740, snapshot manager 722 reads these blocks from storage volume 740 and copies these blocks into a COW cache associated with Snapshot A. In this manner, the content of the blocks of storage volume 740 that are about to be overwritten are preserved in the COW cache. In addition, snapshot manager 722 updates a dirty block list associated with Snapshot A to include location references to these blocks.

Backup application 721 carries out a full backup of storage volume 740 by reading the blocks of snapshot volume for Snapshot A and copying them into a backup volume. If a block being read by backup application 721 is in the dirty block list associated with Snapshot A, e.g., those blocks that are written to while the full backup process is being carried out, snapshot manager 722 causes the read to occur from the COW cache associated with Snapshot A. If a block being read by backup application 721 is not in the dirty block list associated with Snapshot A, snapshot manager 722 causes the read to occur directly from storage volume 740.

For the benefit of the next backup, which is an incremental backup occurring at time 1, Snapshot A is maintained past the end of the full backup and time 1, and used to track changes to storage volume 740 occurring between time 0 and time 1. The reason for maintaining this snapshot past time 1 is to ensure that all changes to storage volume 740 between time 0 and time 1 are reflected in the dirty block list of this snapshot. At time 1, backup application 721 invokes snapshot manager 722 to generate another snapshot of storage volume 740, referenced in FIG. 9 as Snapshot B.

For the incremental backup of storage volume 740 at time 1, backup application 721 examines the dirty block list associated with Snapshot A. The dirty block list for a snapshot can be retrieved through an API or, if such API is not available, by going directly to the COW cache for the snapshot and parsing the COW cache to reconstruct the dirty block list. The dirty block list associated with Snapshot A indicates the blocks that have changed during a time interval that includes the time period of interest, i.e., time period between time 0 and time 1. Backup application 721 then reads the blocks that are identified in the dirty block list associated with Snapshot A, i.e., the changed blocks, from snapshot volume for Snapshot B and copies them into the backup volume. If a block being read by backup application 721 is in the dirty block list associated with Snapshot B, e.g., those blocks that are written to while this incremental backup process is being carried out, snapshot manager 722 causes the read to occur from the COW cache associated with Snapshot B. If a block being read by backup application 721 is not in the dirty block list associated with Snapshot B, snapshot manager 722 causes the read to occur directly from storage volume 740. After all the changed blocks have been copied from the snapshot volume for Snapshot B to the backup volume, the incremental backup process is completed, and Snapshot A is deleted.

The incremental backup process continues in the same manner described above for time period between time 0 and time 1 for the time periods between time 1 and time 2 using Snapshots B and C, between time 2 and time 3 using Snapshots C and D, etc.

In the embodiments disclosed above, the source machines being tracked and the virtual machines that are serving as the backup are located in different datacenters, so that the physical-to-virtual backup system can qualify for disaster recovery. In an alternative embodiment, e.g., in situations where disaster recovery is not an objective, the source machines and the virtual machines may be located in the same datacenter. In addition, as noted previously, further embodiments of the invention may be employed for regular backups.

The embodiments of the invention described above allow the backup application to track modified blocks without installing any drivers in the protected system. Only standard tools, such as the snapshot managers available in all popular operating systems, are required. In addition, it consumes much less resources relative to a hash-based replication cycle.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), such as CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of updating a backup storage volume with incremental changes made to a source storage volume, comprising:
    generating a first snapshot of the source storage volume at or before the beginning of a prior backup cycle and maintaining the first snapshot through a current backup cycle;
    at the beginning of the current backup cycle, generating a second snapshot of the source storage volume and then examining a dirty block list of the first snapshot to identify a set of blocks of the source storage volume that have changed during a time period the first snapshot is maintained, the set of blocks including at least those blocks that have changed between the beginning of the prior backup cycle and the beginning of the current backup cycle; and
    copying the changed blocks into the backup storage volume using the second snapshot.

2. The method according to claim 1, wherein the first snapshot is generated before the beginning of the prior backup cycle.

3. The method according to claim 1, further comprising:
    discarding the first and second snapshots upon completion of the current backup cycle.

4. The method according to claim 3, further comprising:
    generating a third snapshot of the source storage volume at or before the beginning of the current backup cycle and maintaining the third snapshot through the next backup cycle;
    at the beginning of the next backup cycle, generating a fourth snapshot of the source storage volume and then examining a dirty block list of the third snapshot to identify a set of blocks of the source storage volume that have changed during a time period the third snapshot is maintained, the set of blocks including at least those blocks that have changed between the beginning of the current backup cycle and the beginning of the next backup cycle; and
    copying the changed blocks into the backup storage volume using the fourth snapshot.

5. The method according to claim 4, further comprising:
    discarding the third and fourth snapshots upon completion of the next backup cycle.

6. The method according to claim 1, wherein the first snapshot is generated at the beginning of the prior backup cycle.

7. The method according to claim 6, wherein the first snapshot is discarded upon completion of the current backup cycle but the second snapshot is maintained through a next backup cycle.

8. The method according to claim 7, further comprising:
    at the beginning of the next backup cycle, generating a third snapshot of the source storage volume and then examining a dirty block list of the second snapshot to identify a set of blocks of the source storage volume that have changed during a time period the second snapshot is maintained, the set of blocks including at least those blocks that have changed between the beginning of the current backup cycle and the beginning of the next backup cycle; and
    copying the changed blocks into the backup storage volume using the third snapshot.

9. The method according to claim 8, wherein the second snapshot is discarded upon completion of the next backup cycle but the third snapshot is maintained past the completion of the next backup cycle.

10. A computer-readable storage medium containing instructions for causing a computer system to carry out a method of incrementally updating a backup storage volume with changes made to a source storage volume, the method comprising the steps of:
    generating a first snapshot of the source storage volume at or before the beginning of a prior backup cycle and maintaining the first snapshot through a current backup cycle;
    at the beginning of the current backup cycle, generating a second snapshot of the source storage volume and then examining a dirty block list of the first snapshot to identify a set of blocks of the source storage volume that have changed during a time period the first snapshot is maintained, the set of blocks including at least those blocks that have changed between the beginning of the prior backup cycle and the beginning of the current backup cycle; and
    copying the changed blocks into the backup storage volume using the second snapshot.

11. The computer-readable storage medium according to claim 10, wherein the first snapshot is generated before the beginning of the prior backup cycle.

12. The computer-readable storage medium according to claim 10, wherein the method further comprises the step of:
    discarding the first and second snapshots upon completion of the current backup cycle.

13. The computer-readable storage medium according to claim 12, wherein the method further comprises the step of:
    generating a third snapshot of the source storage volume at or before the beginning of the current backup cycle and maintaining the third snapshot through the next backup cycle;
    at the beginning of the next backup cycle, generating a fourth snapshot of the source storage volume and then examining a dirty block list of the third snapshot to identify a set of blocks of the source storage volume that have changed during a time period the third snapshot is maintained, the set of blocks including at least those blocks that have changed between the beginning of the current backup cycle and the beginning of the next backup cycle; and
    copying the changed blocks into the backup storage volume using the fourth snapshot.

14. The computer-readable storage medium according to claim 13, wherein the method further comprises the step of:
    discarding the third and fourth snapshots upon completion of the next backup cycle.

15. The computer-readable storage medium according to claim 10, wherein the first snapshot is generated at the beginning of the prior backup cycle.

16. The computer-readable storage medium according to claim 15, wherein the first snapshot is discarded upon completion of the current backup cycle but the second snapshot is maintained through a next backup cycle.

17. The computer-readable storage medium according to claim 16, further comprising:
    at the beginning of the next backup cycle, generating a third snapshot of the source storage volume and then examining a dirty block list of the second snapshot to identify a set of blocks of the source storage volume that have changed during a time period the second snapshot is maintained, the set of blocks including at least those blocks that have changed between the beginning of the current backup cycle and the beginning of the next backup cycle; and copying the changed blocks into the backup storage volume using the third snapshot.

18. The computer-readable storage medium according to claim 17, wherein the second snapshot is discarded upon completion of the next backup cycle but the third snapshot is maintained past the completion of the next backup cycle.

19. A computer system for tracking changes made to a source storage volume that is being backed up by a backup storage volume, comprising a processing unit that is programmed to:

generate a first snapshot of the source storage volume at or before the beginning of a prior backup cycle and maintain the first snapshot through a current backup cycle;

at the beginning of the current backup cycle, generate a second snapshot of the source storage volume and then examine a dirty block list of the first snapshot to identify a set of blocks of the source storage volume that have changed during a time period the first snapshot is maintained, the set of blocks including at least those blocks that have changed between the beginning of the prior backup cycle and the beginning of the current backup cycle; and copy the changed blocks into the backup storage volume using the second snapshot.

20. The computer system according to claim 19, wherein the processing unit is programmed with a snapshot manager for generating the first snapshot and the second snapshot.

21. The computer system according to claim 20, wherein the snapshot manager creates a copy-on-write cache when generating each of the first snapshot and the second snapshot.

22. The computer system according to claim 20, wherein the snapshot manager maintains a dirty block list for each of the first snapshot and the second snapshot.

23. The computer system according to claim 19, wherein the set of blocks includes blocks that were changed before the beginning of the prior backup cycle and not between the beginning of the prior backup cycle and the beginning of the current backup cycle.

24. The computer system according to claim 19, wherein the set of blocks includes blocks that were changed after the beginning of the current backup cycle and not between the beginning of the prior backup cycle and the beginning of the current backup cycle.

* * * * *